UNITED STATES PATENT OFFICE.

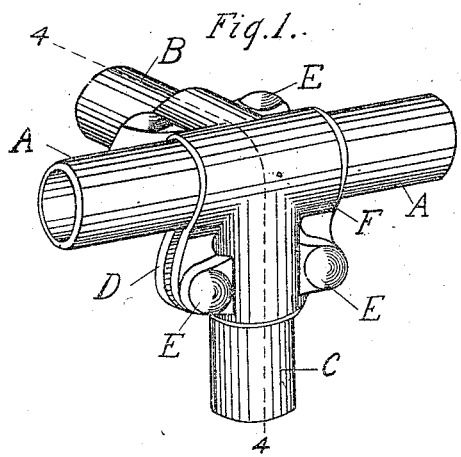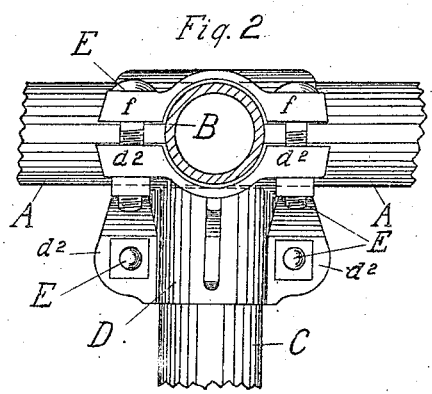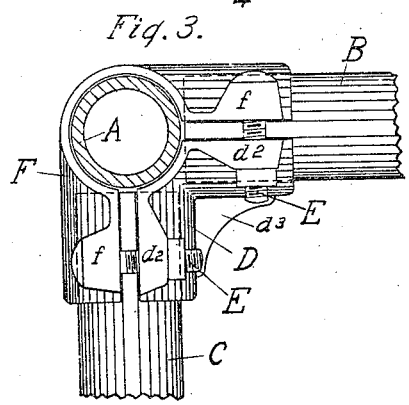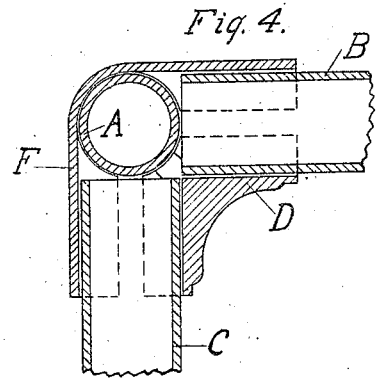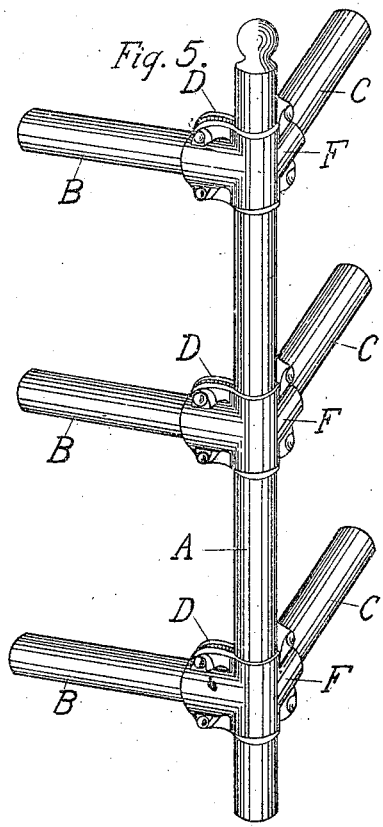

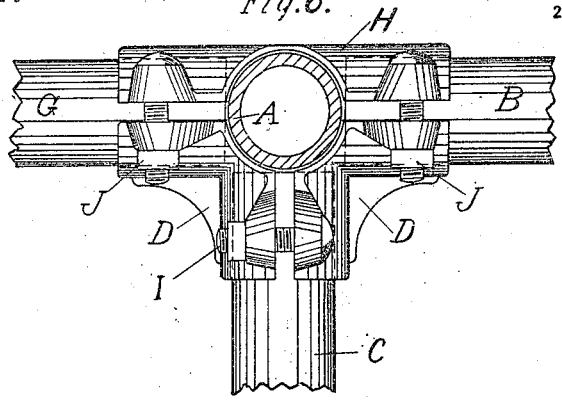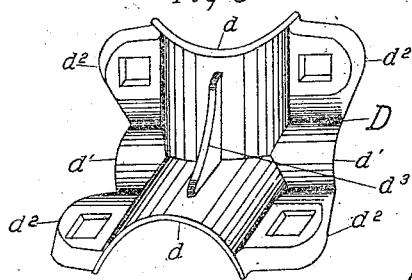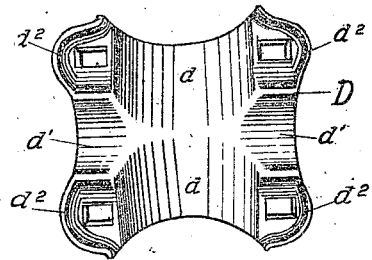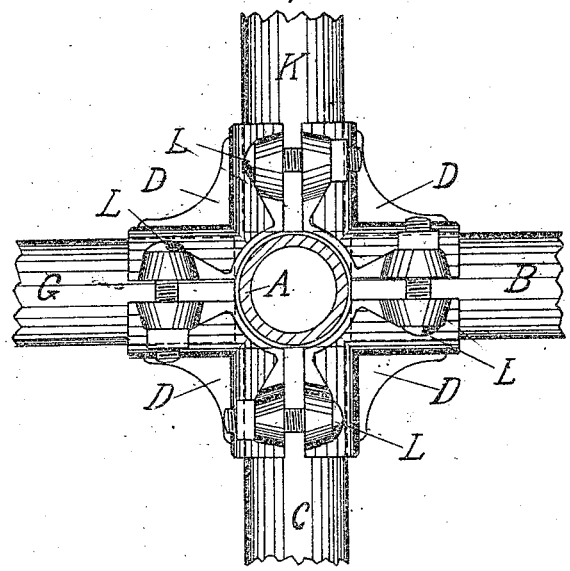

WILLIAM LOUDEN, OF FAIRFIELD, IOWA.

STRUCTURAL COUPLING FOR PIPES, SHAFTS, &c.

1,150,781. Specification of Letters Patent. Patented Aug. 17, 1915.

Application filed November 21, 1910. Serial No. 593,475.

*To all whom it may concern:*

Be it known that I, WILLIAM LOUDEN, residing at Fairfield, in the county of Jefferson and State of Iowa, have invented a new and useful Improvement in Structural Couplings for Pipes, Shafts, &c., of which the following is a specification.

My invention relates to structural couplings for pipes, shafts, etc., designed to hold three or more sections of the pipes or shafts together, each disposed at an angle to the other, and it consists essentially of a coupling member having its faces disposed at an angle to one another, in combination with coöperating clamping means which when fastened together intimately engage and rigidly secure the several sections or members to be coupled or held. Also of other features set forth in this specification and more definitely pointed out in the claims.

In the accompanying drawings forming a part of this specification, Figure 1 is a perspective of a coupling designed to hold three sections together and embodying the features of my invention. Fig. 2 is a rear view and Fig. 3 is an edge view of the same. Fig. 4 is a section on line 4—4 of Fig. 1. Fig. 5 is a perspective showing the same in use to form the corner of a pen or inclosure. Fig. 6 is a side view of a form of coupling designed to hold four sections together. Fig. 7 is a side view of a coupling designed to hold five sections together.
Figs. 8 and 9 are enlarged detail views.

Referring to the drawings A represents a pipe extended through the coupling, while B and C are separate sections of pipe having their ends abutting the body of the section A and held together by the coupling at an angle to each other and also to the section A.

D represents one of the coupling members having its ends set at an angle to each other and provided with longitudinal concaves $d$ in its outer faces coming together to a common point at the center (see Figs. 8 and 9) to receive the adjacent sides of the ends of the pipes B and C, also a transverse concave $d'$ in its central portion interrupted at the center by the concaves $d$ to receive the adjacent side of the pipe A. It is also provided with lugs $d^2$ to receive bolts E, and is preferably fitted on its outer side with a strengthening flange or rib $d^3$.

F represents a coöperating member of the coupling which may be used in connection with the member D to hold three sections together. Its ends are also set at an angle to each other and it is provided with longitudinal concaves in its inner faces at an angle to each other to receive the adjacent sides of the sections B and C, while its central portion extending at an angle to the first-mentioned concaves is curved to fit approximately two-thirds of the way around the pipe A. It is also provided with lugs $f$ to receive the bolts E. It will be readily seen that when the coupling members D and F are placed upon the pipe sections A, B and C, and the bolts E are passed through the lugs $d^2$ and $f$ and drawn tight, the pipes A, B and C will be securely held together at an angle to each other.

Fig. 5 illustrates a use that may be made of my coupling when constructed in the form shown in Figs. 1, 2, 3 and 4. The section of pipe or shaft A is made to assume a vertical position, the same as a corner post of a pen or other inclosure, and a series of sections B and C are made to assume a horizontal position to form the rails of a pen or inclosure, and they are securely held in position on the section A by means of my coupling members D and F. A structure of this kind is readily erected and adjusted or removed and will form a neat, inexpensive, substantial structure.

Fig. 6 shows a modification where four sections of pipes or shafts A, B, C and G may be held together at an angle to each other. In this case two of the coupling members D are used in the inner angles, and a coöperating member H instead of having its ends disposed at an angle to each other like the member F, has them set in the same alinement and fitted with crosswise intersecting concaves on their inner faces to fit the adjacent sides of the pipes A, B and G. The duplicate members D are connected together by bolts I by being passed through the holes in their lugs as already described, and the member H is connected in the same manner to the other ends of the members D, by means of the bolts J. By drawing up the bolts I and J tightly the pipes A, B, C and G will all be securely held together.

Fig. 7 shows a further modification by means of which five pipes A, B, C, G and K will be held together, all at an angle to each other. In this case four of the coupling members D are used one in each of the four inner angles and are held together by the bolts L passing through their lugs as already described. It is preferable as shown in the drawings that the pipes or shafts be disposed substantially at right angles to each other but the angle may be varied to suit requirements. It is also, practical to connect six or more pipes or shafts together, all at an angle to each other by making the angles of the ends of the members D more acute, as will be readily understood by those skilled in the art. In case the through pipes or shafts A should be composed of two sections, the ends thereof may be securely held together by the grasp of the coupling members D and F, when arranged as shown in Fig. 1 or by the members D and H shown in Fig. 6, or by the members D alone when used as shown in Fig. 7. In either form the device is extremely simple and inexpensive as well as effective and is readily adjusted to suit different requirements.

What I claim is:

1. A coupling element having two grooved faces lying in planes which are inclined to each other and which intersect, and having a clamping surface formed at the apex, in combination with coöperating clamping means between which element and means all the members to be clamped are embraced and secured.

2. A coupling element which engages at least three frame members, two at least of which members converge toward a third at a center, said coupling element comprising two sides which occupy the angle formed by and between the converging members, said sides having grooves which receive and embrace the latter, and the apex of the element impinging against the third member, in combination with one or more additional coöperating members which embrace the other sides of the frame members and coöperate with the coupling element in securing the latter rigidly together.

3. A coupling element having two faces lying in planes which are inclined to each other, and are clamped against the adjacent sides and near the ends of two members to be coupled together, said members set in positions corresponding with the adjacent faces of the coupling element, said coupling element clamped against the adjacent side of an intermediate member which intersects the plane of the other members, the intersecting member being held by the same coupling element which holds the other members in contact with the coupling element, in combination with one or more coöperating members which embrace the other sides of the members to be coupled.

4. A coupling element which engages and coöperates with other means in holding at least three frame members, two at least of which members converge toward a third as a center, said coupling element comprising two sides which occupy the angle formed by and between the converging members, said sides having lugs through which holes are formed, all of said holes located in planes parallel with the planes in which the converging frame members are located, and fastening means extending through said holes for drawing the sides of the coupling element securely against all three of said members to be coupled.

WILLIAM LOUDEN.

Witnesses:
CARRIE L. BEEDLE,
JOE E. ROBERTSON.